US012103222B2

(12) United States Patent
Wood et al.

(10) Patent No.: US 12,103,222 B2
(45) Date of Patent: Oct. 1, 2024

(54) METHODS AND SYSTEMS FOR DRAWN FUSED FILAMENT FABRICATION PRINTING

(71) Applicants: THE CURATORS OF THE UNIVERSITY OF MISSOURI, Columbia, MO (US); TIGER ENERGY SOLUTIONS, LLC, Belton, MO (US)

(72) Inventors: Ronald Wood, Benton, MO (US); Hsin-Yeh Hsieh, Columbia, MO (US); Chung-Ho Lin, Columbia, MO (US); George C. Stewart, Columbia, MO (US); Mason W. Schellenberg, Columbia, MO (US); Shibu Jose, Columbia, MO (US)

(73) Assignees: THE CURATORS OF THE UNIVERSITY OF MISSOURI, Columbia, MO (US); TIGER ENERGY SOLUTIONS, LLC, Belton, MO (US)

( * ) Notice: Subject to any disclaimer, the term of this patent is extended or adjusted under 35 U.S.C. 154(b) by 483 days.

(21) Appl. No.: 17/416,301

(22) PCT Filed: Dec. 23, 2019

(86) PCT No.: PCT/US2019/068392
§ 371 (c)(1),
(2) Date: Jun. 18, 2021

(87) PCT Pub. No.: WO2020/132688
PCT Pub. Date: Jun. 25, 2020

(65) Prior Publication Data
US 2022/0072764 A1    Mar. 10, 2022

Related U.S. Application Data

(60) Provisional application No. 62/783,996, filed on Dec. 21, 2018.

(51) Int. Cl.
*B29C 64/118*    (2017.01)
*B29C 64/209*    (2017.01)
(Continued)

(52) U.S. Cl.
CPC .......... *B29C 64/118* (2017.08); *B29C 64/209* (2017.08); *B29C 64/295* (2017.08);
(Continued)

(58) Field of Classification Search
None
See application file for complete search history.

(56) References Cited

U.S. PATENT DOCUMENTS 4,330,619 A    5/1982    Goldstein
4,650,662 A    3/1987    Goldfinger et al.
(Continued)

FOREIGN PATENT DOCUMENTS

WO    1994011518 A2    5/1994
WO    2012068402 A2    5/2012
WO    2018213482 A1    11/2018

OTHER PUBLICATIONS

Yan, Yongnian, et al. "Layered manufacturing of tissue engineering scaffolds via multi-nozzle deposition." Materials Letters 57.18 (2003): 2623-2628. (Year: 2003).*
(Continued)

*Primary Examiner* — Carlos R Ortiz Rodriguez
(74) *Attorney, Agent, or Firm* — Thompson Coburn LLP; Steven M. Ritchey

(57) ABSTRACT

A drawn fused filament fabrication method of three-dimensional printing is disclosed in which the filament extruded is variable and not restricted to the diameter of the nozzle used for extrusion. This method composes three steps. The first is to extrude a small amount of material at a starting position. Next, the extruding head pulls the extruded material along
(Continued)

while moving away from the starting position. During this time to material cools down and solidifies. As a result, a thin filament is formed. Third, once the extruding head moves to a destination, a small amount of material can be extruded and deposited to anchor this newly formed filament to a surface. The drawn fused filament fabrication method may be used to print three-dimensional parts having significant lower thickness than the diameter of the nozzle used to extrude the printing material.

20 Claims, 8 Drawing Sheets

(51) Int. Cl.
*B29C 64/295* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,356,804 | A | 10/1994 | Desnick et al. |
| 5,439,882 | A | 8/1995 | Feola et al. |
| 5,858,238 | A | 1/1999 | McRea et al. |
| 6,399,749 | B1 | 6/2002 | Smith |
| 6,878,283 | B2 | 4/2005 | Thompson |
| 6,899,813 | B2 | 5/2005 | Dolecek et al. |
| 7,033,498 | B2 | 4/2006 | Wong |
| 7,037,642 | B2 | 5/2006 | Hei |
| 7,074,605 | B2 | 7/2006 | Smith |
| 7,521,174 | B2 | 4/2009 | Acharya et al. |
| 7,993,896 | B2 | 8/2011 | Clausen et al. |
| 8,697,411 | B2 | 4/2014 | Clausen et al. |
| 9,005,946 | B2 | 4/2015 | Yang et al. |
| 9,074,200 | B2 | 7/2015 | Kosugi et al. |
| 9,132,175 | B2 | 9/2015 | Stewart et al. |
| 9,358,331 | B2 | 6/2016 | Fulkerson et al. |
| 9,670,270 | B2 | 6/2017 | Sabbadini et al. |
| 9,713,627 | B2 | 7/2017 | Mufti et al. |
| 2016/0297104 | A1* | 10/2016 | Guillemette ........... B33Y 30/00 |
| 2017/0157826 | A1 | 6/2017 | Hishiki |
| 2017/0157831 | A1 | 6/2017 | Mandel et al. |
| 2017/0361527 | A1 | 12/2017 | Saarikoski et al. |
| 2018/0015655 | A1 | 1/2018 | Gheorghescu et al. |
| 2018/0111308 | A1 | 4/2018 | Mantell et al. |
| 2018/0147826 | A1 | 5/2018 | Inamura et al. |
| 2018/0318932 | A1 | 11/2018 | Myerberg et al. |

OTHER PUBLICATIONS

Carletti, Eleonora. 3D scaffolds for tissue engineering produced by microfabrication technology. Diss. University of Trento, 2009. (Year: 2009).*

Wei, Chuang, and Jingyan Dong. "Hybrid hierarchical fabrication of three-dimensional scaffolds." Journal of Manufacturing Processes 16.2 (2014): 257-263. (Year: 2014).*

Ali, Md Hazrat, Nazim Mir-Nasiri, and Wai Lun Ko. "Multi-nozzle extrusion system for 3D printer and its control mechanism." The International Journal of Advanced Manufacturing Technology 86 (2016): 999-1010. (Year: 2016).*

Vijayavenkataraman, Sanjairaj, W. F. Lu, and J. Y. H. Fuh. "3D bioprinting of skin: a state-of-the-art review on modelling, materials, and processes." Biofabrication 8.3 (2016): 032001. (Year: 2016).*

Kong, Yong Lin, et al. "3D printed bionic nanodevices." Nano today 11.3 (2016): 330-350. (Year: 2016).*

Koch, Carsten, Luke Van Hulle, and Natalie Rudolph. "Investigation of mechanical anisotropy of the fused filament fabrication process via customized tool path generation." Additive Manufacturing 16 (2017): 138-145. (Year: 2017).*

Pei, Xuan, et al. "Creating hierarchical porosity hydroxyapatite scaffolds with osteoinduction by three-dimensional printing and microwave sintering." Biofabrication 9.4 (2017): 045008. (Year: 2017).*

Kong, Yong Lin, et al. "Corrigendum to "3D printed bionic nanodevices"[Nano Today 11 (2016) 330-350]." Nano today 25 (2019): 156. (Year: 2019).*

Ahmad et al., "Enzyme Immobilization: An Overview on Nanoparticles as Immobilization Matrix", Biochemistry & Analytical Biochemistry, 2015, pp. 1-8, vol. 4, No. 2.

Chapanian et al., "Enhancement of Biological Reactions on Cell Surfaces Via Macromolecular Crowding", Nature Communications, Aug. 2014, pp. 1-12, vol. 5, No. 1.

Lee et al., "Direct Electron Transfer of Enzymes in a Biologically Assembled Conductive Nanomesh Enzyme Platform", Advanced Materials, 2016, pp. 1577-1584, vol. 28.

Star et al., "Electronic Detection of Specific Protein Binding Using Nanotube FET Devices", American Chemical Society, 2003, pp. 459-463, vol. 3, No. 4.

* cited by examiner

Example Known Values for Producing a Filter of a Specific Material

Polypropylene
- Max speed to draw filaments: 4000 mm/s
- Fiber layer height: 0.25 mm
- Nozzle and Printing Unit Head Temperature: 205°C
- Printing Bed Temperature: 90°C
- Spacing between outer shells: 0.45 mm

ABS
- Max speed to draw filaments: 2000 mm/s

Carbon-ABS Composite
- Max speed to draw filaments: 500 mm/s

PLA
- Max speed to draw filaments: 1000 mm/s
- Fiber layer height: 0.5 mm

FIG. 8

METHODS AND SYSTEMS FOR DRAWN FUSED FILAMENT FABRICATION PRINTING

CROSS-REFERENCE AND PRIORITY CLAIM TO RELATED PATENT APPLICATIONS

This patent application is a 35 U.S.C. § 371 National Phase Application of International Patent Application No. PCT/US2019/068392, filed Dec. 23, 2019, claiming the benefit of U.S. provisional patent application Ser. No. 62/783,996, filed Dec. 21, 2018, and entitled "Methods and Systems for Drawn Fused Filament Fabrication Printing," which are incorporated herein by reference in their entireties.

INTRODUCTION

With a rise in three-dimensional printing technology, many different structures are being conceptualized and built. Some three-dimensional printing devices focus on large scale constructions to create buildings and advanced structures. Other projects focus on smaller components such as tools and pieces for machinery. However, each of these projects and the range of size of the requested component to be printed face significant challenges. There are many different types of three-dimensional printing processes used to create these objects. Fused filament fabrication (FFF) is a method of three-dimensional printing and is one of the most popular methods of three-dimensional printing today. The popularity of fused filament fabrication is due to its low cost, the wide range of materials that can be used, and minimal post processing required. Fused filament fabrication operates in extruding material, such as a thermoplastic, out of a heated nozzle onto a build plate or printing bed. Due to this mode of operation, fused filament fabrication provides advantages over competing three-dimensional printing techniques. Another example of three-dimensional printing is stereolithography. Stereolithography uses light to selectively cure parts of a polymer solution to form a printed part. The stereolithography method is limited to polymers that are photocurable. Other three-dimensional printing methods, such as methods that use selective laser sintering, require the removal of excess material from the finished part. This can be problematic for parts with complex or small features.

In fused filament fabrication, the resolution (limit on how fine the printer can print) is restricted by the size of nozzle that is used to extrude the material, such as thermoplastic. Use of a small nozzle also considerably slows down the time needed to print a part in fused filament fabrication, because less material is being extruded in a given amount of time. Therefore, the inventors envision and present development of a method of three-dimensional printing in which the filament extruded is variable and not restricted to the diameter of the nozzle used for extrusion. The method proposed by the inventors presents a solution to this problem in general fused filament fabrication systems. This novel method of fused filament fabrication can produce extruded filaments much smaller than the nozzle used to extrude them. The inventors have named this method, disclosed in detail below, drawn fused filament fabrication (DFFF).

BRIEF DESCRIPTION OF THE DRAWINGS

The accompanying drawings, which are incorporated in and form a part of the specification, illustrate the disclosed embodiments and, together with the description, serve to explain certain inventive principles. In the drawings:

FIG. 8 shows a table of materials that may be used to produce a filter with the drawn fused filament fabrication method in accordance with an embodiment of the disclosure.

DETAILED DESCRIPTION OF EXAMPLE EMBODIMENTS

Figure 1:
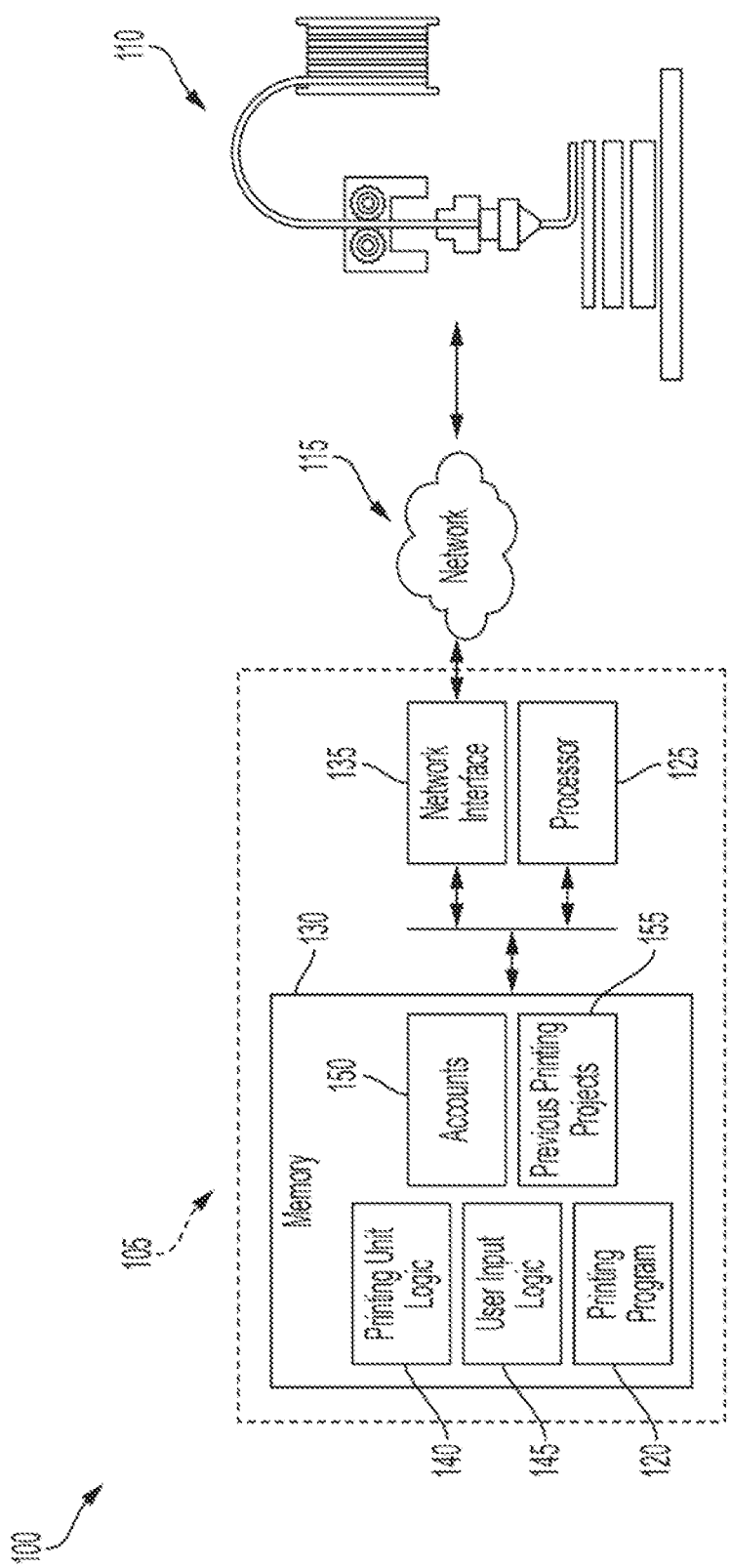
FIG. 1 illustrates an example printing system in accordance with an embodiment of the disclosure.

Referring to the accompanying drawings in which like reference numbers indicate like elements, FIG. 1 illustrates an example printing system 100. The printing system 100 can be employed as a combination of a computing device 105 in communication with a printing unit 110 through a network 115. The computing device 105 of the printing system 100 may have stored within it a printing program 120 which may be software with an executable set of instructions to be employed to operate the printing unit 110 to create an object. The printing program 120 may be a software platform purchasable and licensed for use on an end user's computing device 105. The printing program 120 may also be as a software-as-a-service (SaaS) platform in which the computing device 105 connects to an outside database through the network 115 to communicate and access the printing program 120. As a SaaS platform, the printing program 120 may be implemented as part of computing device 105 operating as one or more servers. The computing device 105 may comprise a processor 125, a memory 130, and a network interface 135. The processor 125, memory 130, and network interface 135 can interconnected with each other in any of a variety of manners (e.g., via a bus, via a network, etc.)

The network interface 135 can provide an interface for the computing device 105 to a network 115. The network 115 can be any suitable communication network or combination of communication networks, such as the Internet, wired and wireless telecommunication networks, etc. Through the network 115, the computing device 105 can interact with the printing unit 110 and possible outside databases for retrieve additional information related to the printing of an object. The computing device 105 can take the form of any suitable computer (such as a desktop computer, laptop computer, tablet computer, or smart phone) or larger computer system such as a server or server network. The network interface 135 may take any suitable form for carrying out network interface functions, examples of which include an Ethernet interface, a serial bus interface (e.g., Firewire, USB 2.0, etc.), a chipset, and antenna adapted to facilitate wireless communication, and/or any other interface that provides for wired and/or wireless communication. The network interface 135 may also include multiple network interfaces. Other configurations are possible as well.

The processor 125 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc. that are suitable for carrying out the operations described herein.

The memory 130 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory 130 may also be integrated in whole or in part with other components of the system. Further, the memory 130 may be local to the processor 125, it should be understood that the memory 130 (or portions of memory) could be remote from the processor 125, in which case the processor 125 may access such remote memory 130 through network interface 115 (or some other network interface).

The memory 130 may store software programs or instructions that are executed by processor 125 during operation of the printing system 100. For example, the memory 130 may include printing unit logic 140, which can take the form of a plurality of instructions configured for execution by processor 125 for communicating with the printing unit 110 to determine, retrieve, and store variables of operation done by the printing unit 110. In some instances, these variables include an operational state of the printing unit 110, information related to the material extruded by the printing unit 110, information related to the nozzle of the printing unit 110, and the operational temperature of the nozzle of the printing unit 110. The memory 130 may also store user input logic 145, which can take the form of a plurality of instructions configured for execution by processor 125 for receiving, processing, and delivering input data to the printing program 120 to aid in the calibration, calculation, and printing of an object by the printing unit 110. The user input logic 145 may related to structural data points for the object to be printed including, but not limited, size, shape, and thickness of the desired object for printing. The memory 130 may also store the printing application, such as a software-printing program 120, which can take the form of a plurality of instructions configured for execution by the printing unit 110 to create the object as a three-dimensional printed object.

The memory 130 may also be configured as a database or other storage design where a plurality of accounts 150 for end users is stored. If the printing program 120 is stored on an outside database or server, the computing device 105 may have to communicate with the outside database or server to access the printing program 120. To do so, the user of the computing device 105 may be required to have an account 150 to access the printing program 120. Identifying information, printing program licenses, and login credentials can be stored in the account 150 for the user. Other memory addresses in the memory can store previous printing projects 155. The previous printing projects 155 may include previous user inputs used to create the object to be run on a specific version of the printing program 120. In these instances, the printing program 120 can access the previous printing projects 155 to easily create the same object without having to input all the necessary parameters to allow the printing program 120 to function. It should be understood that the data structures stored within the memory could be a single data structure or a plurality of data structures. It should also be understood that data structures stored within the memory could be fluid and change over time as the content of memory changes.

Figure 2:
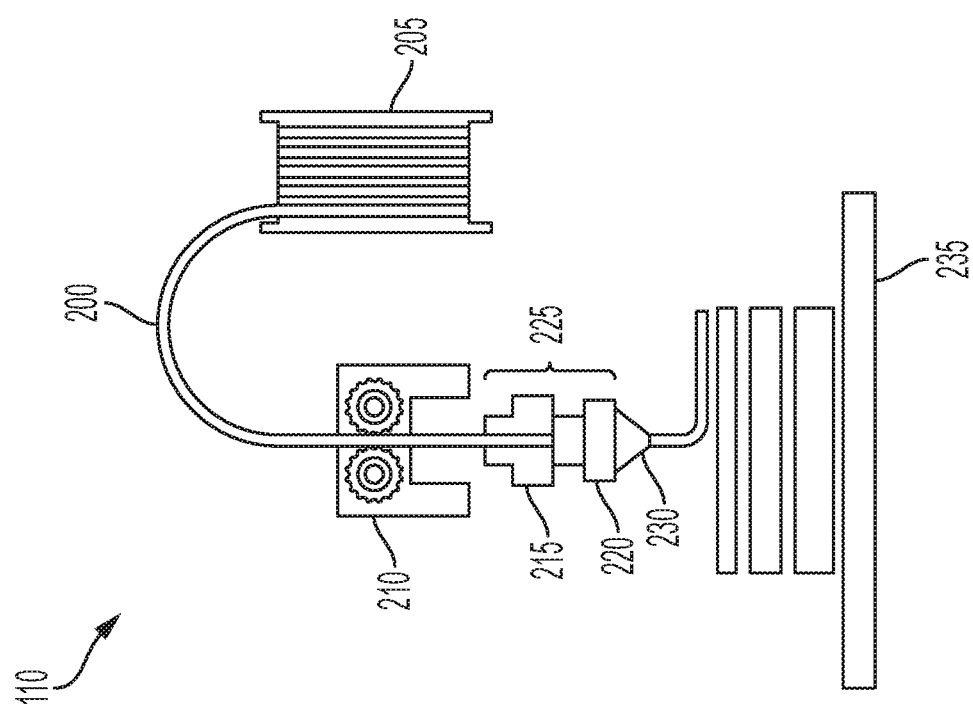
FIG. 2 illustrates an example printing unit in accordance with an embodiment of the disclosure.

Turning now to FIG. 2, and example printing unit 110 is viewed. FIG. 2 shows the main components that are present within a three-dimensional printing unit 110 that is capable of printing three-dimensional objects using the fused filament fabrication method. The components may be all contained within a housing (not shown) that may rest on a surface to provide a level printing plane to create the object to be printed. To print a three-dimensional object, a material is needed that can create the shape and form of the object. In the fused filament fabrication method, this material is called a filament 200. Many different types of polymer materials may make up the filament. However, the filament 200 should be a material that can be heated to and beyond a melting point and then extruded by the printing unit 110. The filament 200 can be stored on a spool 205. The filament 200 is wound around the spool 205 and feeds into the heated components of the printing unit 110. Storing the filament 200 on a spool 205 allows for continuous operation of the printing unit 110 as the material used to print the object will not easily run out and need to be refilled or replaced.

The filament 200 from the spool 205 enters an area of the printing unit 110 called the extruder 210. The extruder 210 controls the feed movement of the filament 200. The extruder 210 can be a geared mechanism that pulls the filament 200 and pushes it toward the heating element of the printing unit 110. The extruder 210 is considered the cold end of the printing unit 110. The extruder 210 also controls how fast or slow the filament 200 is released by the printing unit 110 to create the object.

After leaving the extruder 210, the filament 200 enters a heating element 215. The heating element 215 has a heater that heats the solid filament beyond its melting point. Dependent on the material used as the filament 200, the heating element 215 can be adjusted in temperature to make sure the filament 200 reaches beyond the melting point. The heating element 215 may be a coil or other type of heating element design to encompass and consistently heat the filament as it enters the heating element 215.

Adjacent to the heating element 215 is the hot end 220 of the printing unit head 225. The hot end 220 contains the melted filament 200 from the heating element 215 as it is pushed downward when more filament 200 enters the heating element 215 from the extruder 210. The hot end 220 may have a heat sink and a cooling fan in some embodiments. Most importantly, the hot end 200 has a nozzle 230 at the bottom end. The nozzle 230 is the last element of the printing unit head 225. The nozzle 230 extrudes the heated material out of the hot end 220 to create the object in a desired geometry. At the bottom and below the nozzle 230 is a build plate or printing bed 235. The nozzle 230 may extrude the heated material out of the hot end 220 and onto the build plate or printing bed 235 to start the creation of the object. The material, or filament 200, may stick to the build plate or printing bed 235 and the object is constructed. In some instances, it is desirous that the build plate or printing bed 235 be heated, but in other instances, the build plate or printing bed 235 can remain at room temperature or cooled. After printing the three-dimensional object, the object can be carefully removed or scraped off of the build plate or printing bed 235 if it is stuck.

Figure 3:
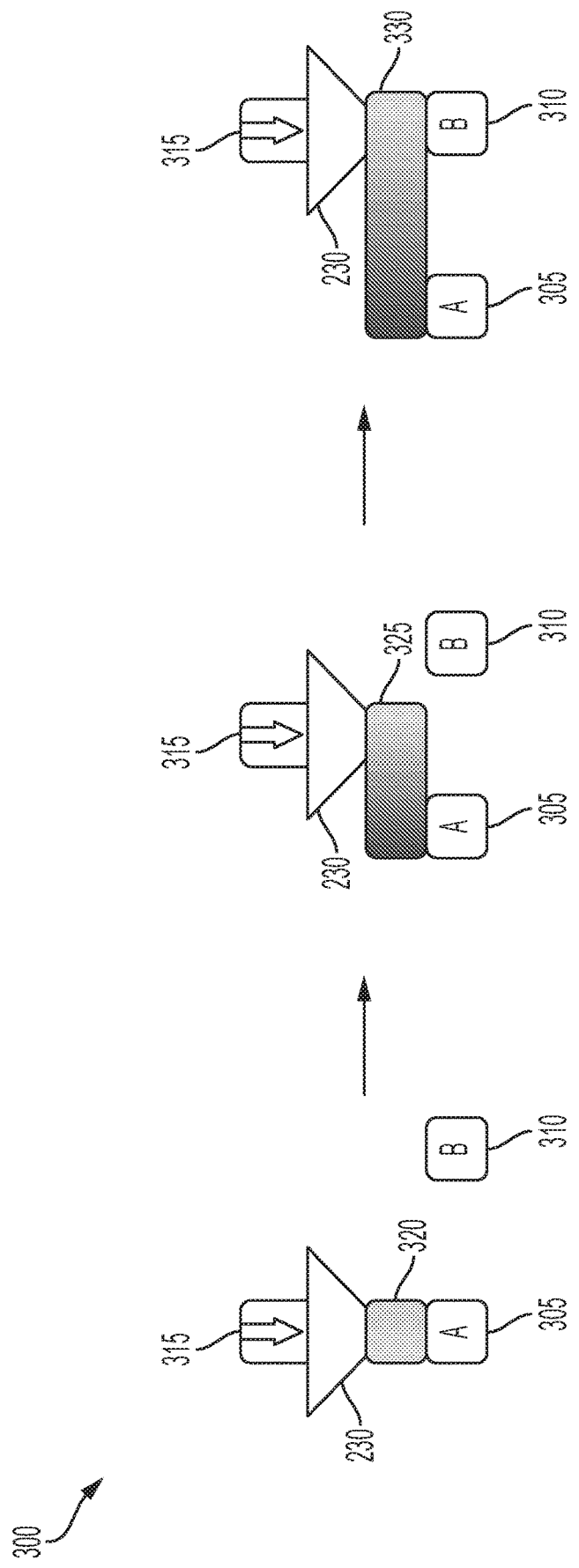
FIG. 3 illustrates an example of the common fused filament fabrication method used to print a three-dimensional object in accordance with an embodiment of the disclosure.

FIG. 3 shows an example of the common fused filament fabrication 300 method used to print a three-dimensional object. The common fused filament fabrication 300 method can be used to print an object between a starting point 305, point A, and an end point 310, point B. In the fused filament fabrication method, molten filament is fed in area 315 into the hot end 220 of the printing unit head 225 near the nozzle 230. The nozzle 230 extrudes a starting portion 320 of the filament 200 at the starting point 305, point A. Then, in the common fused filament fabrication 300 method the printing unit head 225 will move in a direction toward the end point 310. The starting portion 320 of the filament cools while the printing unit head 225 moves in this direction and is considered solidifying filament. While the printing unit head 225 moves toward the end point 310, the nozzle 230 continues to extrude 325 filament at a constant rate to maintain the thickness of the solidifying filament. Then, at the end point 310, the ending portion 330 of filament 200 is extruded from the nozzle 230 and allowed to cool. This anchors the filament 200 between the starting and end points 305 and 310 and results in a continuous shape of the filament 200 extruded from the nozzle 230.

In many instances of creating an object in three dimensions, the common fused filament fabrication 300 method is perfectly acceptable. Most applications of three-dimensional printing desire the appearance of the outer shell of the printed object over the interior of the printed object. Thus, creating these filament portions at a consistent cross-sectional thickness gives the appearance of the perfectly created exterior of the object. Afterwards, the exterior is usually polished or painted to finish the illusion. However, the common fused filament fabrication 300 method may not be particularly conducive to producing interior portions of three-dimensional objects, or the fine structures needed for certain three-dimensional objects that have an important function within a device or system. Perhaps it is required that a structural element is needed to connect from one sidewall to an opposite sidewall. Common fused filament fabrication 300 methods of three-dimensional printing creates layers upon layers of the needed structural element from the build plate or printing bed 235 upward until the structural element is complete. The structural element is then obscured once the exterior of the three-dimensional object is finished printing. Yet, there are certain situations where structural elements of the printed object must connect to opposite sidewalls to create a specific interior that cannot be achieved by the common fused filament fabrication 300 method. For example, a filter may need to be printed that has a specific and alternating weave pattern between sidewalls to allow the filter to function property and trap unwanted particles. In this instance, the common fused filament fabrication 300 method would not work as the constant extrusion of molten filament will cause these filter layers to dip because of gravity and mate with previously created filter layers. Additionally, the size of the filter layers is a concern. To achieve the greatest amount of filtration, the gaps between the filter layers must be as small as possible and dependent on the size of the particles to be caught by the filter. The thickness of the extruded material coming out of the nozzle 230 in the common fused filament fabrication 300 method is limited by the size of the nozzle 230 itself. For some of the minute sizes the filter layers need, the smallest nozzle 230 sizes are still not enough to accomplish this task. Thus, the inventors have created the drawn fused filament fabrication method to address situations where the interior of the printed object is of the upmost importance and where smaller sizes of extruded filament layers may be created that are not bound to the diameter size of the nozzle used for extruding the filament. The range of the nozzle diameter to be used by the drawn fused filament fabrication method can vary between 20 μm and be as large at 400 μm. In some large scale industrial embodiments, the nozzle diameter may be significantly bigger.

Figure 4:
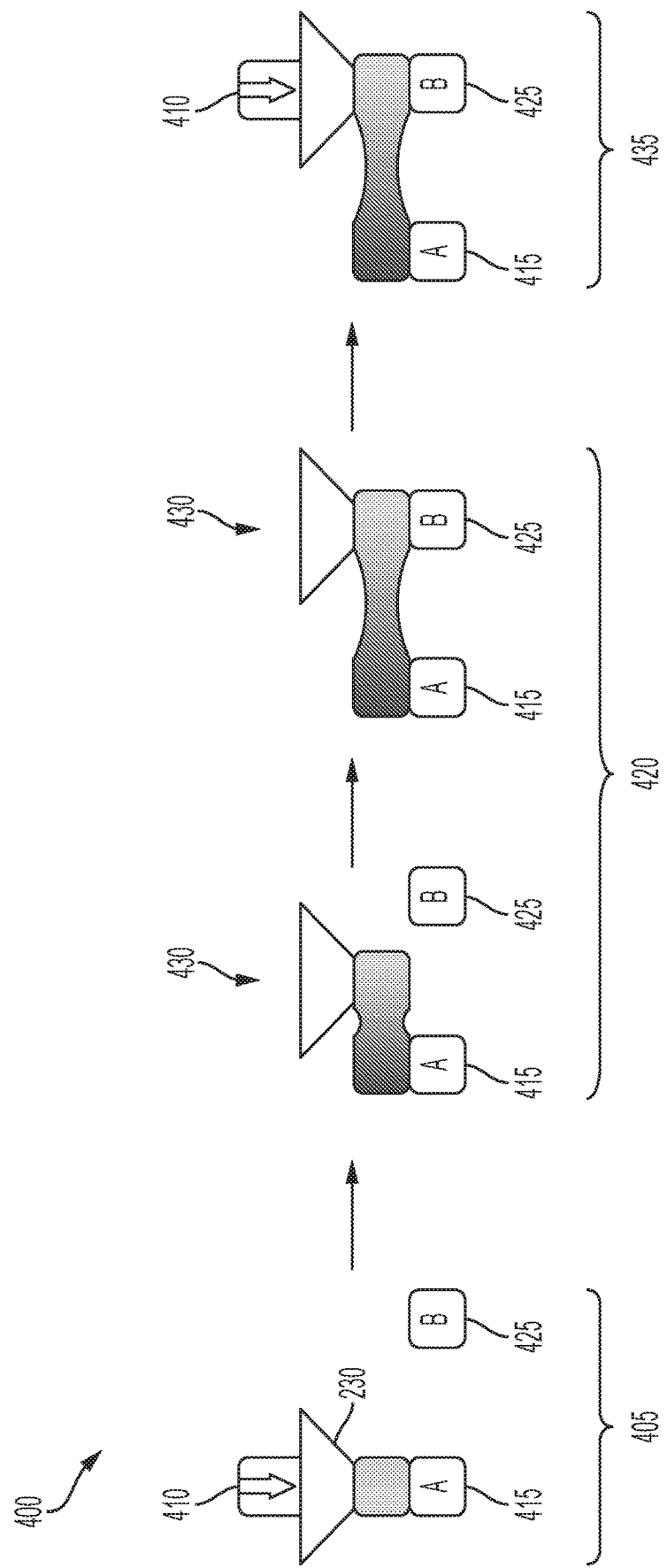
FIG. 4 illustrates an example of the drawn fused filament fabrication method used to print a three-dimensional object in accordance with an embodiment of the disclosure.

Turning now to FIG. 4, an example of the drawn fused filament fabrication 400 method used to print a three-dimensional object is viewed. The drawn fused filament fabrication 400 method has at least three specific steps of operation. At the first step 405, the nozzle 230 extrudes a small amount of material or filament 410 at a starting position 415, point A. At this point filament is still flowing into the printing unit head 225 and is heated by the heating element 215 to be extruded by the nozzle 230. At the second step 420, the nozzle 230 pulls the extruded material, or filament, along while moving away from the starting position 415. The material extruded onto the starting position 415 has begun to cool at this time so that it is securely attached to the starting position 415 when the movement of the nozzle 230 occurs. While the nozzle 230 is moving between the starting position 415 and the end position 425, point B, no additional material 430, or filament, is extruded by the nozzle 230. The speed of the movement can vary by the type of material used to create the filament. It is envisioned that creating a filament by way of the drawn fused filament fabrication method, the speed of movent of the nozzle 230 and printing unit head 225 may vary. For example, the speed of movement of the nozzle 230 and printing unit head 225 may range from 2,000 mm/s to 10,000 mm/s. During this movement time, the material cools down and solidifies. As a result, and as an example, a thin filament (30 microns (μm)) in diameter can be formed using a nozzle 230 with a 400-micron diameter. In fact, depending on the size of the nozzle 230, the range of the created filaments may be between 1 μm and more that 100 μm. In the third step 435, once the nozzle 230 has moved to the end position 425, point B, a small amount of material can be extruded 410 and deposited to anchor this newly formed filament to a surface. The drawn fused filament fabrication 400 method is a significant improvement upon the current limitations of common fused filament fabrication 300 method. As with common fused filament fabrication 300 method, the smallest available common nozzle on the market is 150 μm and the drawn fused filament fabrication 400 method can, with use of a 400 μm nozzle create a thin filament of 30 μm.

The diameter of the filament formed by the drawn fused filament fabrication 400 method can be varied by altering the amount of material initially deposited, the temperature of the nozzle 230 and hot end 220, the length of the pause between extruding and moving, and the speed at which the nozzle 230 and printing unit head 225 moves. The temperature of the nozzle 230 may range between 160° C. and 300° C. The drawn fused filament fabrication 400 method can be used to change the diameter of the formed filament during the pulling process without changing the nozzle 230. These advancements may result in the significant saving of time to print large objects with fine features as well as allow for fine features to be printed in a three-dimensional landscape.

Like most three-dimensional printing systems, the printing system 100 using the drawn fused filament fabrication 400 method requires use of a software-printing program 120 to create the object to be printed. When using the drawn fused filament fabrication 400 method, the drawn filaments are anchored to starting and ending points. These starting and ending points must be located and identified to the printing program 120. The starting and ending points of the drawn fused filament fabrication 400 method are located on either the build plate/printing bed 325 or on previously extruded material called a layer. The layers may build upon one another to create the shape of the three-dimensional object. On each layer, multiple drawn filaments may be printed and attached to the layer.

Figure 5:
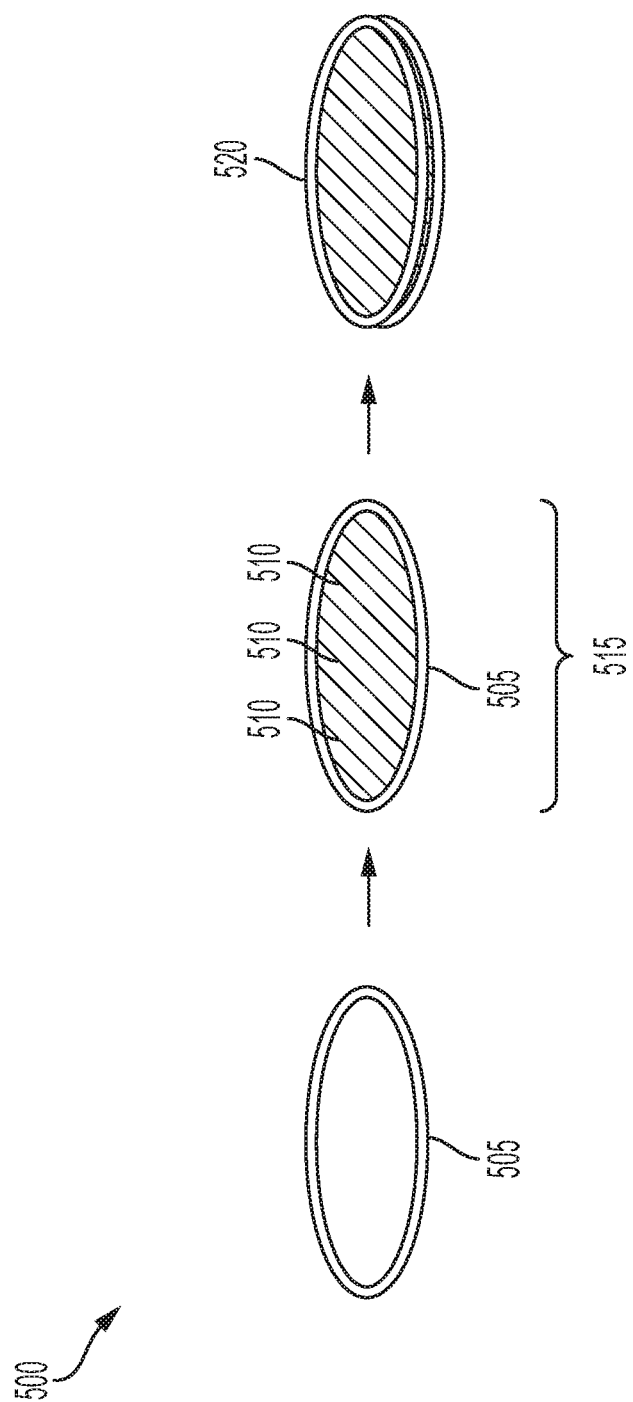
FIG. 5 shows an example layering of the printing process with the drawn fused filament fabrication method in accordance with an embodiment of the disclosure.

As seen in FIG. 5, example layering 500 of the printing process with the drawn fused filament fabrication 400 method is shown. First, the drawn fused filament fabrication 400 method creates a shell 505. The shell 505 can be created by a common fused filament fabrication 300 method or by the drawn fused filament fabrication 400 method. The shell 505 is used as the anchor for the filaments 510 that will be connected to and span the interior of the shell 505. Next, at least one thin filament 510 is printed by the drawn fused filament fabrication 400 method based on the above disclosure in FIG. 4. In many instances, a plurality of thin filaments 510 may connect to the shell 505 at different starting and end points. Together, the combination of the shell 505 with the at least on thin filament 510 create the layer 515 of the drawn fused filament fabrication 400 method. After one layer 515 is complete, the drawn fused filament fabrication 400 method prints a second shell 520 above the at least one thin filament attached and connected to the bottom shell 505. The distance between shell 505 and the second shell 520 can vary by application. For example, if a filter is to be printed, the distance between shell 505 and the second shell 520 may be as big as 0.45 µm, but may likely be smaller. In this type of configuration, the shell components serve to support at least one filament 510 of each layer 515. In some instance, multiple shell layers can be printed between the filaments 510 of a specific layer 515 and it is possible depending on the geometric shape of the printed object that some thin filaments 510 may be printed to connect one shell 505 of a layer 515 to another shell 520 of a different layer.

Figure 6:
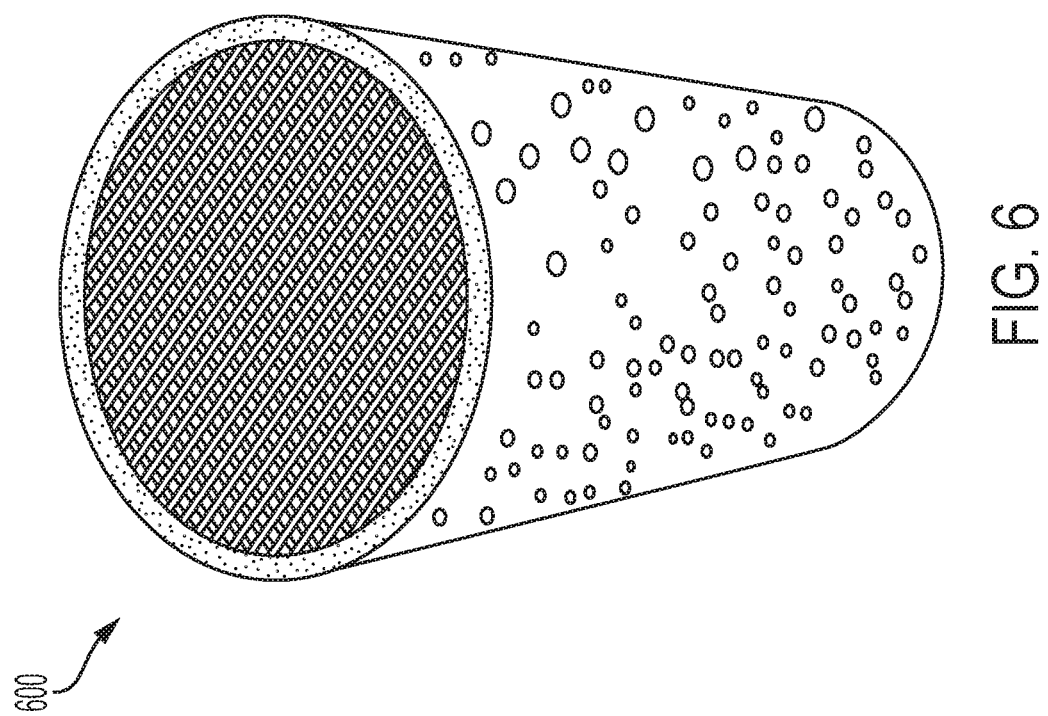
FIG. 6 shows an example filter which may be printed by the printing system in accordance with an embodiment of the disclosure.

To generate the object desired to be printed by the drawn fused filament fabrication 400 method, a software printing program 120 may be executed that directs the movement and extruding instructions to the printing unit 110. The software printing program 120 may be created to print a specific object, or it may take inputs from the user to print an object based on the user inputs. In either instance, the printing program 120 is necessary to be in communication with both the user and the printing unit 110 to complete the three-dimensional printing. As seen in FIG. 6, the printing unit 110 in combination with a printing program 120 may print a filter 600. The filter 600, printed by way of the drawn fused filament fabrication 400 method, creates and object that has an optimal surface area to volume ratio for a specific case of use. The filter 600, seen in FIG. 6, has a plurality of thin filaments on each layer. In some embodiment, the plurality of thin filaments may have a covering material on them to add in the functionality of the filter 600 being produced. For example, the covering material may add in the passage of particles through the filter 600. As the shells with the plurality of thin filaments are stacked, the filter 600 design takes shape and creates the necessary surface are to volume ratio for the interior of the filter. Such filters may be used in blood conversion systems, while other aspects of possible use will be described in greater detail below.

In order to generate the software code of the printing program 120 that will instruct the printing unit 110 how to make the filter column, several input parameters must be defined. To understand the meaning of each parameter, and its effect on the finished product, it is important to understand the general process in which the printing unit 110 makes the filter column.

The column is made up of stacked layers, each printed sequentially. Each layer 515 can be considered either a 'shell' 505 or 'filament' 510 layer, or a combination of both. The shell 505 servers as support for the filament 510, and the first layer 505 to be printed by the printing unit 110 is always the shell 505. In this example of creating the filter 600, the shell 505 is the outer surface of the column. After this layer 515 is printed, filaments 510 are printed on top of it creating the layer 515. Filaments 510 start and end on the shell 505, to which they are connected. The printing of a filament 510 involves three steps. The first is to extrude a small amount of material onto the shell 505 at a starting position. Next, the nozzle 230 and printing unit head 225 moves away from the starting position, to another point of the shell, pulling some material along with it. The material cools and solidifies, forming a filament 510. Lastly, once the nozzle 230 and printing unit head 225 is at the destination, it extrudes a small amount of material to anchor the newly formed filament to the shell 505. Each layer can consist of one or many individual filaments 510. After the filaments are printed and connected to the shell 505, a next shell layer 520 is printed on top of it. Multiple shell layers can be printed between filaments layers, and vice versa.

The input parameters of the printing program 120 can be divided into subgroups. These subgroups are parameters that define the shell 505, define the filaments 510, define how tall the column will be, and other aspects of the printing process. The parameters that define the shell 505 include the radius of the shell 505, the resolution of the shell 505, the number of shells 505 to be printed in one shell layer, the spacing between those shells 505, and the extrusion multiplier. The impact of changing the radius of the shell 505 is self-explanatory. The resolution of the shell 505, which defines the number of points used to define the shell on a Cartesian plane, can have a profound effect on the quality of the printed object and speed of the printing program 120. When a high resolution is defined, the geometry of the shell 505 is more defined. This produces a shell 505 that is more of a true circle, but can be unnecessary if the geometry of the shell 505 can be approximated by a lower resolution. Higher resolutions mean that the program will need to produce more lines of software code, thereby slowing down the printing process. Too low of a resolution will lower the quality of the printed object to the point where the printed geometry no longer adequately resembles the desired geometry. Multiple shells can be printed in a single shell layer if a thicker wall of the filter is desired. The spacing between the shells 505 can be used to fine tune the printing process. The shells 505 in a single layer can be spaced so that they are separate from each other or stand as groups. This may be desired to save material when the mechanical strength of a solid wall is not needed. The extrusion multiplier is a parameter for fine-tuning the amount of material extruded for each shell 505.

The input parameters that define the filaments 510 are how much material is extruded at the start position and the destination, how far apart the filaments 510 are spaced from one another, the speed at which the nozzle 230 moves (when transitioning from the start position and destination), how long the nozzle 230 waits before it moves from the start position to the destination, the temperature of the nozzle 230 and hot end 220, how far away from the shell 505 the nozzle 230 is positioned, and how the filament 510 layers are orientated with respect to one another. The amount of material extruded at the start of the printing process will have an effect on the thickness of the filament 510 produced. Increasing the amount of material deposited at the start position will increase the final filament diameter. Care should be taken when decreasing the amount of material deposited so that there is enough to form a filament 510. Enough material needs to be extruded at the destination to anchor the filament 510. The distance between the nozzle 230 and the shell 505 effects filaments formation. If the distance is too small then a filament 510 will not form. How far the filaments 510 are set apart from each other can also affect the success of the print. If filaments 510 are too close to each other, the nozzle 230 and hot end 220 may melt adjacent filaments 510 while passing by them as it draws new filaments 510. The speed at which the nozzle 230 moves from the starting position to the destination can have enormous impact on successful filament formation. If the nozzle 230 and printing unit head 225 moves too fast, the filament 510 being formed will break. If the nozzle 230 and printing unit head 225 moves too slow the material may become too cool and fail to make a filament 510. If the filament 510 being formed does not fail it may sag onto filaments 510 below it. This may be a desired effect in some cases, as it may be required in those cases that the filaments 510 bind to each other. Through this process, a layer of filaments can be formed that have different orientations to one another. The temperature of the nozzle 230 and printing unit head 225 effects the viscosity of the material that is drawn by the nozzle 230 and printing unit head 225 moving from the start position to the destination. If the temperature is too low, the filament 510 will fail to form because the material is too rigid. If the temperature is too high, the filament 510 will fail to form because the material has too low a viscosity and the nozzle 230 and printing unit head 225 cannot pull it along. The orientation of the filaments 510 refers to the filament layers being rotated with respect to one another.

How tall the column of the filter 600 is can be defined by two inputs: (1) the number of layers printed and (2) their respective height. If the height is altered for the shell layers, care should be taken to change the extrusion multiplier accordingly. The extrusion multiplier determines how much material is extruded per unit length. If the height is too low, not enough plastic material will be extruded to form the part or object. If the height is too high, the part or object will become a mess of plastic material. Other general inputs include the printing bed temperature (or build plate temperature) and z-offset. The printing bed temperature, or build plate temperature, can affect the quality of the print by effecting how well the first layer adheres to the build plate or printing bed 235 as well as how the printed material cools. If there is poor adhesion between the printed material and the build plate or printing bed 235, then the material will come lose and the print will fail. If the material cools too quickly, warping of the printed material may occur causing the print to fail. The correct temperature to use depends on the surface of the build plate or printing bed 235 and the material being extruded. A z-offset can also be specified, which raising the starting of the print to a specified height. This can be used to print the filter 600 or another part onto an object placed or printed on the build plate or printing bed 235.

Figure 7:
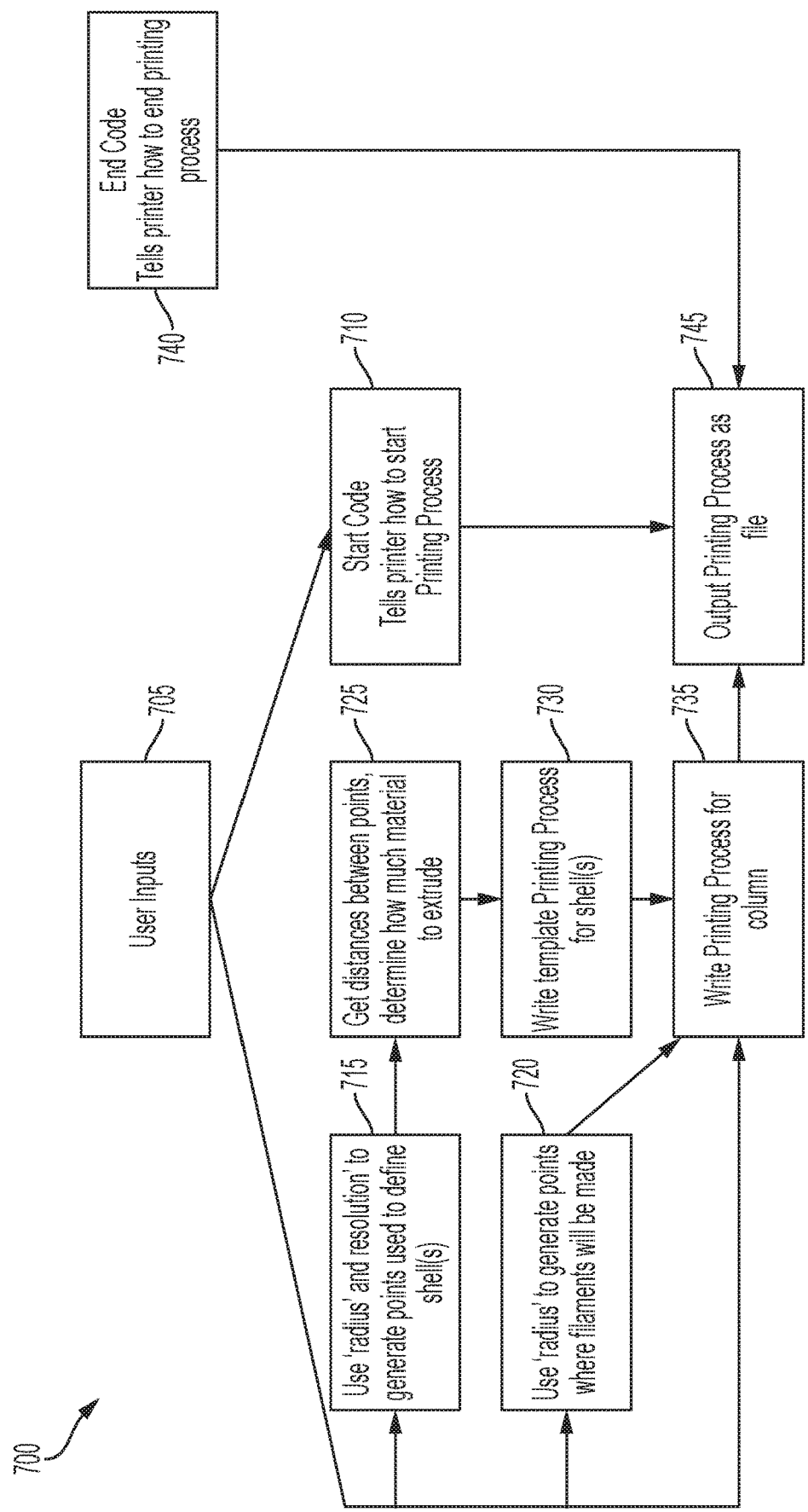
FIG. 7 shows a flowchart with the general process followed by the printing program using the drawn fused filament fabrication method to create an object in accordance with an embodiment of the disclosure.

As viewed in FIG. 7, a flowchart is show with the general process 700 followed by the printing program 120 to create an object, and in this example, a filter 600. The printing program 120 starts, in block 705, with clearing any previously stored variables and then reading the input values defined by the user. Then in block 710, the printing program then defines how the printer will initiate the printing process. Relevant variables here are the printing bed temperature, or build plate temperature, and nozzle or printing unit head temperature. The printing program 120 could also input a previous printing project code 155 at this point to create an earlier object that was stored within the memory 130 of the computing device 105.

The printing program 120 then, in block 715, uses the defined radius and resolution of the shell 505 and generates the specified number of Cartesian coordinates that lie on a circle with the radius specified. The next step is to use a similar process to determine the Cartesian coordinates for any outer shells 505. Relevant inputs here are the number of outer shells 505 to be printed and the space between them. The Cartesian coordinates of the shells are then plotted for visual inspection by the user.

Next, in block 720, the coordinates for the start positions and destinations for the filaments 510 are determined. The relevant input parameters here being the spacing between the filaments 510, the coordinates from Cartesian plane that lie on the shell 505, the amount extruded at the start position, the speed the nozzle 230 and printing unit head 225 will move between the starting position and the destination, and the time the nozzle 230 and printing unit head 225 will pause at the starting position after depositing material.

Then, in block 725, the distance between the points that define the shell 505 is then calculated and used to determine the amount of material to extrude to print the shell 505. The relevant user input here is the extrusion multiplier and shell layer height. Then the amount of material extruded for each outer shell 505 is calculated in a similar fashion. This data, along with the Cartesian coordinates of the shell, are used to generate shell printing program code in block 730 that details how to print the shell 505. The outer shell printing program code for the outer shells 505 is generated in a similar fashion.

At this point, all of the parts needed to make the final printing program code have been defined. The first step in making the final printing program code is to define where the printing process will start after initialization. This is done by defining the starting z position, which is the sum of the layer height and z-offset. The nozzle 230 and printing unit head 225 is now at the correct z position for printing, but not the correct x or y position. This will be defined by the next layer of printing program code added. Outer shells 505 are printed first, so this is the next layer of printing program code to be added, if outer shells 505 have been specified. The program iterates through each line of the premade printing program code for the outer shells 505 and updates the extrusion distances. The updated printing program code is then appended to the master printing program code. Next, the printing program code for the inner shell 505 is added. It is added in a similar fashion as the outer shells 505. The extrusion distances are updated and then it is appended to the master printing program code. Now that the first layer has been laid down the z position is updated, raising the nozzle 230 and printing unit head 225 to height of the next layer to be printed.

Before the filaments 510 are printed, the nozzle 230 and printing unit head 225 is moved to the start position along the path of the shell 505. This is so that the nozzle 230 and printing unit head 225 is not unnecessarily positioned close to filaments 510 that have already been formed as this may cause melting of the filaments 510. Next, the Cartesian coordinates of the filament start positions and destinations are rotated around the center of the shell 505, and then transformed into printing program code. Relevant user inputs here are the degree of rotation of the filament layers with respect to each other, the amount extruded at the start position and destination, the speed at which the nozzle 230 and printing unit head 225 moves from the start position to the destination, and the how long the nozzle 230 and printing unit head 225 pauses at the start position after it extrudes material and before it begins to move to the destination. This is then appended to the master printing program code. Once the layer has been printed, the z position is changed thereby raising the nozzle 230 and printing unit head 225 to the height of the next layer. Before the next layer can be printed, the nozzle 230 and printing unit head 225 is moved along the path of the shell 505, to avoid filaments 510, to the position where the shell 505 will begin printing. The process then begins again, until all layers have been added.

Once all of the shell 505 and filament 510 layers have been added to the master printing program code as seem in block 735, the start command is appended to the beginning of the master printing program code. The printing program code specifying how to end the printing process, in block 740, is then appended to the end of the master printing program code, and the entire code is exported, in block 745, to a user-defined file.

FIG. 8 shows a table of materials 800 that may be used to produce a filter 600 with the drawn fused filament fabrication 400 method. Materials that are possible to be used to create the filter include polypropylene 805, acrylonitrile butadiene styrene (ABS) 810, carbon-acrylonitrile butadiene styrene composite 815, and polylactic acid 820. Depending on the material used, the max speed to draw the filaments 825 differs between the materials. This ensures that the filaments are properly created at a specific thickness and will not break during the drawn fused filament fabrication 400 method. Other variables for these materials include fiber layer height 830, nozzle and printing unit head temperature 835, printing bed temperature 840, and spacing between outer shells 845. While these materials are viewed as examples, it should be understood that additional materials and thermoplastics could be used to work with the drawn fused filament fabrication method.

The drawn fused filament fabrication 400 method can be used to create any object where the interior of the object is of great importance to the overall function and design of the part. In these instances, surface area to volume ratio of the interior may be the most important factor of the printed object. The drawn fused filament fabrication 400 method is envisioned to be used in many different applications to produce the necessary products and parts. One such application is in the field of bioreactors. The drawn fused filament fabrication technology could be used to create platforms for enzyme-based bioreactors.

An ideal platform would have to provide high surface area to volume ratio for maximizing distribution of enzymes. By using the drawn fused filament fabrication technique, platforms can be easily customized and produced in any geometry. The fine filaments can provide excellent surface area to volume ratio and they can easily be manipulated and orientated to direct the flow of the precursor solution so the interaction between substrate and enzyme would be enhanced.

The drawn fused filament fabrication 400 method could also be used in the field of tissue scaffolding. The drawn fused filament fabrication method could be used to create sacrificial molds for tissue scaffolds and microfluidic devices. Mass transport of cell nutrients and waste via diffusion in tissue scaffolds is a limitation on cell viability. A mold of vascular channels could be three-dimensionally printed by the drawn fused filament fabrication technology to mimic microvasculatures and used to cast a tissue scaffold. These vascular channels would facilitate flow of nutrients into the scaffold where they could diffuse into it, as well as the flow of toxic waste products away from cells. The drawn fused filament fabrication technology could be used to produce scaffolds with vasculature of varying diameter, orientation, and density using inexpensive printers and materials. Microfluidic chambers with fine features could also be made using sacrificial scaffolds. Three-dimensional printing is currently used in microfluidic chamber fabrication, and the drawn fused filament fabrication technology could be used to print chambers with fine features using low cost printing systems.

The drawn fused filament fabrication 400 method could also be used in the field of textiles. Textiles and fabrics could be produced with this drawn fused filament fabrication technology. In recent years, there has been growing interest in customizable three-dimensional printed articles of clothing. The drawn fused filament fabrication method of three-dimensional printing could be used to directly produce clothing or produce textiles used to make clothing. Current methods have been criticized for producing textiles that are too ridged and brittle. This is because the fibers used to make the textile are too thick. This problem could be solved with the drawn fused filament fabrication method because the fibers generated are thin and can be printed using flexible thermoplastics.

The drawn fused filament fabrication 400 method could also be used in the field of optical components. Optical fibers could be made with this drawn fused filament fabrication method of three-dimensional printing and an appropriate thermoplastic such as PMMA or polycarbonate. The fibers could have variable thickness and be interfaced with optical microcavities for sensing applications. Due to the nature of the fabrication process the optical fibers could be integrated into other three-dimensional printed structures. The plastic could also be doped before printing to produce doped optical fibers.

The embodiments were chosen and described in order to best explain the principles of the invention and its practical application to thereby enable others skilled in the art to best utilize the invention in various embodiments and with various modifications as are suited to the particular use contemplated.

As various modifications could be made in the construction and method herein described and illustrated without departing from the scope of the invention, it is intended that all matter contained in the foregoing description or shown in the accompanying drawings shall be interpreted as illustrative rather than limiting. For example, different structures than a filter may be printed and different parameters may be entered and stored by the printing program but can achieve the same functionality of the underlying invention. Thus, the breadth and scope of the present invention should not be limited by any of the above-described example embodiments, but should be defined only in accordance with the following claims appended hereto and their equivalents.

What is claimed is:

1. A method of printing a three-dimensional object, the method comprising:
providing a printing system which extrudes a filament material to form a printed three-dimensional object, the printing system having a computing device for controlling the printing system and a nozzle for extruding the filament material from the printing system;
calculating a first amount of filament material to be extruded from the nozzle with the computing device;

extruding the first amount of filament material from the nozzle at a starting position of the printed three-dimensional object;

ceasing the extrusion of filament material from the nozzle when a first extruded amount of filament material is deposited at the starting position;

calculating a movement path of the nozzle with the computing device;

moving the nozzle along the calculated movement path to draw the first extruded amount of filament material along the movement path, wherein the nozzle contacts the first extruded amount of filament material to pull by the first extruded amount of filament material along the calculated movement path, and wherein the nozzle does not extrude the filament material when drawing the first extruded amount of filament material along the calculated movement path;

calculating an end point of the printed three-dimensional object with the computing device; and extruding a second amount of filament material from the nozzle at the end point to anchor the first extruded amount of filament material drawn by the nozzle at the end point.

2. The method of claim 1, wherein the first amount of filament material extruded from the nozzle is heated when being extruded into the starting position.

3. The method of claim 1, where the first extruded amount of filament material and the second extruded amount of filament material are a same filament material.

4. The method of claim 1, wherein the nozzle has an extrusion point diameter between 20 μm and 400 μm.

5. The method of claim 1, wherein the first extruded amount of filament material drawn along the calculated movement path forms a filament member.

6. The method of claim 5, wherein the filament member is between 1 μm to 100 μm in diameter.

7. The method of claim 1, further comprising:

calculating a shell material to be extruded from the nozzle with the computing device;

extruding the filament material from the nozzle to form the shell material; and attaching the first amount of filament material from the nozzle at the starting position located on the shell material.

8. The method of claim 7, further comprising:

calculating a second shell material to be extruded from the nozzle with the computing device;

extruding the filament material from the nozzle to form the second shell material; and attaching the second shell material on top of each the shell material, the first amount of filament material, and the second amount of filament material.

9. The method of claim 8, wherein a distance between the shell material and the second shell material is no greater than 0.45 mm.

10. The method of claim 1, wherein the nozzle has a temperature within the range of 160° C. to 300° C.

11. The method of claim 1, wherein the movement path of the nozzle is calculated to occur within the range of 2,000 mm/s to 10,000 mm/s.

12. The method of claim 1, wherein the filament material extruded from the nozzle consists of either a polypropylene material, an acrylonitrile butadiene styrene material, a carbon acrylonitrile butadiene styrene composite material, a polylactic acid material, or a polymer material that can change shape and form by temperature increase and set by temperature decrease.

13. The method of claim 1, wherein the nozzle has an extrusion point, the extrusion point have an extrusion point diameter; and the first extruded amount of filament material drawn along the calculated movement path forms a filament member, the filament member having a filament member diameter.

14. The method of claim 13, wherein the filament member diameter of the filament member is smaller than the extrusion point diameter of the extrusion point of the nozzle.

15. The method of claim 1, wherein the second amount of filament material extruded from the nozzle is heated when being extruded at the end point to anchor the first extruded amount of filament material.

16. The method of claim 1, wherein the nozzle, after extruding the first extruded amount of filament material, pauses a time before drawing the first extruded amount of filament material along the calculated movement path.

17. The method of claim 16, wherein the time of the pause of the nozzle allows for cooling of the first extruded amount of filament material before moving the first extruded amount of filament material along the calculated movement path.

18. The method of claim 1, wherein the nozzle may be either a first nozzle, having a first nozzle extrusion point with a first nozzle extrusion point diameter, or a second nozzle, having a second nozzle extrusion point with a second nozzle extrusion point diameter, either the first nozzle or the second nozzle capable of drawing the first extruded amount of filament material along the calculated movement path to form a filament member having a filament member diameter.

19. The method of claim 18, wherein the first nozzle extrusion point diameter and the second nozzle extrusion point diameter are different.

20. The method of claim 19, wherein each the first nozzle or the second nozzle, the first nozzle extrusion point diameter being different than the second nozzle extrusion point diameter, form the filament member, being either a first filament member formed by the first nozzle or a second filament member formed by the second nozzle, wherein each the first filament member and the second filament member have a same filament member diameter.

* * * * *